(12) United States Patent
Hu et al.

(10) Patent No.: US 9,902,457 B2
(45) Date of Patent: Feb. 27, 2018

(54) BICYCLE FRAME WITH A HIDDEN BATTERY PACK

(71) Applicant: ASTRO ENGINEERING CO., LTD., Changhua, Changhua Hsien (TW)

(72) Inventors: Samuel Hu, Changhua (TW); Cheng-Lian Wang, Changhua (TW); Chang-Chun Chen, Changhua (TW)

(73) Assignee: ASTRA ENGINEERING CO., LTD., Changhua (TW)

( * ) Notice: Subject to any disclaimer, the term of this patent is extended or adjusted under 35 U.S.C. 154(b) by 9 days.

(21) Appl. No.: 15/245,645

(22) Filed: Aug. 24, 2016

(65) Prior Publication Data
US 2017/0297647 A1  Oct. 19, 2017

(30) Foreign Application Priority Data

Apr. 13, 2016 (TW) .............................. 105205150 U

(51) Int. Cl.
*B62K 19/30* (2006.01)
*B62M 6/90* (2010.01)

(52) U.S. Cl.
CPC .............. *B62K 19/30* (2013.01); *B62M 6/90* (2013.01); *B62K 2208/00* (2013.01)

(58) Field of Classification Search
CPC ....................................................... B62M 6/90
See application file for complete search history.

(56) References Cited

U.S. PATENT DOCUMENTS

| 7,934,576 B2 * | 5/2011 | Munksoe | B62K 11/00 180/220 |
| 8,881,857 B2 * | 11/2014 | Binggeli | B62M 6/90 180/206.1 |
| 8,979,110 B2 * | 3/2015 | Talavasek | B62M 6/90 280/279 |
| 2011/0284302 A1 * | 11/2011 | Chiu | B60K 1/04 180/220 |

(Continued)

FOREIGN PATENT DOCUMENTS

| TW | 370069 | 9/1999 |
| TW | M316210 | 8/2007 |

(Continued)

OTHER PUBLICATIONS

English Abstract of TW M367142.

(Continued)

*Primary Examiner* — Kevin Hurley
(74) *Attorney, Agent, or Firm* — Hershkovitz & Associates, PLLC; Abe Hershkovitz

(57) ABSTRACT

A bicycle frame with a hidden battery pack has a tube member and a battery pack. The tube member is hollow and has a peripheral surface, a receiving space, and a replacement opening. The receiving space is formed inside the tube member. The replacement opening is defined in the peripheral surface of the tube member and communicates with the receiving space. The battery pack is mounted in the receiving space and has multiple batteries. Each two adjacent batteries of the multiple batteries are connected to each other and are able to rotate relative to each other. Each battery of the multiple batteries is capable of being rotated or swung to pass through the replacement opening.

17 Claims, 14 Drawing Sheets

(56) References Cited

U.S. PATENT DOCUMENTS

2016/0303961 A1* 10/2016 Hendey ...................... B62J 1/08
2016/0311494 A1* 10/2016 Schliewert ............... B62M 6/90
2017/0096190 A1*  4/2017 Yu ........................... B62M 6/90

FOREIGN PATENT DOCUMENTS

| TW | M367142 | 10/2009 |
| TW | M389675 | 10/2010 |
| TW | 201215534 | 4/2012 |
| TW | M430432 | 6/2012 |
| TW | 201343473 | 11/2013 |
| TW | I424934 | 2/2014 |
| TW | 535200 U * | 1/2017 |

OTHER PUBLICATIONS

English Abstract of TW M389675.
English Abstract of TW M430432.
English Abstract of TW 201215534.
English Abstract of TW 370069.
English Abstract of TW I424934.
English Abstract of TW M316210.
English Abstract of TW 201343473.

* cited by examiner

BICYCLE FRAME WITH A HIDDEN BATTERY PACK

BACKGROUND OF THE INVENTION

1. Field of the Invention

The present invention relates to an electric bicycle, and more particularly to a bicycle frame with a hidden battery pack.

2. Description of Related Art

With increasing awareness in exercising and environmental protection, cycling, an activity including both exercising and environmental protection elements, turns out to be a popular means for transportation. The emergence of electric bicycles boosts the evolution of bicycles. Propulsion of electric bicycle is offered by pedaling force of a cyclist accompanied with power offered by an electrical motor. Electric bicycles are able to reduce physical burden of the cyclist and increase relaxing effect to the cyclist during long distance or sloped rides.

Electric bicycles are equipped with batteries for supplying electric power to the electric motor. A traditional electric bicycle has a battery assembled on a luggage carrier or a supporting rack for assembling battery. The exposed battery not only diminishes the aesthetic appeal in the look of the traditional electric bicycle, but also causes damage to the exposed battery due to bumping or moisture. More particularly, the battery alters the center of gravity of the traditional electric bicycle and causes negative influences on riding stability and safety of the traditional electric bicycle. Therefore, a design that integrally assembles the battery with the bicycle frame has been developed by the manufacturer of electric bicycle.

TW Patent No. M367142, TW Patent No. M389675, TW Patent No. M430432, and TW Patent Publication No. 201215534 disclose a battery assembling structure which mainly has the battery assembled inside one of the tube members of the bicycle frame. The tube member has two opposite ends and an opening formed at one of the two opposite ends of the tube member for inserting a rod-shaped battery to hide the battery inside the tube member of the bicycle frame. Since the battery is axially inserted into the tube member, an outline of the tube member has to be particularly designed in accordance with an outline of the battery and is difficult to be applied to regular bicycle frames. And the opening formed at one of the two opposite ends of the tube member is difficult to machine and diminishes the rigidity, durability, and safety of the bicycle frame structure.

TW Patent No. 370069, TW Patent No. 1424934, TW Patent No. M316210, and TW Patent Publication No. 201343473 disclose another battery assembling structure which mainly has an elongated recess formed in the peripheral surface of one of the tube members for receiving the rod-shaped battery. The size of the elongated opening is larger than the size of the rod-shaped battery to allow the rod-shaped battery to be easily and directly inserted in the elongated recess. However, this kind of battery assembling structure ruins the aesthetic appeal in the look of the conventional electric bicycle and has a defect of poor fastening reliability of the battery. Furthermore, the large sized elongated recess formed in the peripheral surface of the tube member even diminishes rigidity of the bicycle frame structure more severely and causes negative influence on durability and safety.

To overcome the shortcomings of the battery assembling structure of the conventional electric bicycle, the present invention provides a bicycle frame with a hidden battery pack to mitigate or obviate the aforementioned problems.

SUMMARY OF THE INVENTION

The main objective of the present invention is to provide an improved means to assemble the battery of an electric bicycle and a strengthened bicycle frame to prolong the service lifetime of an electric bicycle.

The bicycle frame comprises a tube member and a battery pack. The tube member is hollow and has a peripheral surface, a receiving space, and a replacement opening. The receiving space is formed inside the tube member. The replacement opening is defined in the peripheral surface of the tube member and communicates with the receiving space. The battery pack is mounted in the receiving space and has multiple batteries. Each two adjacent batteries of the multiple batteries are connected to each other and are able to rotate relative to each other. Each battery of the multiple batteries is capable of being rotated or swung to pass through the replacement opening.

The battery pack hidden inside one of the tube members of the bicycle frame is protected from bumping or moisture. Each battery of the battery pack is able to rotate or swung relative to an adjacent battery to pass through the replacement opening. Therefore, the size of the replacement opening can be kept small. The small sized replacement opening can preserve the integrity of the bicycle frame without affecting the rigidity of the bicycle frame.

Other objects, advantages, and novel features of the invention will become more apparent from the following detailed description when taken in conjunction with the accompanying drawings.

DETAILED DESCRIPTION OF PREFERRED EMBODIMENT

The present invention provides a bicycle frame with a hidden battery pack. The bicycle frame has multiple tube members. The battery pack is mounted inside one of the tube members of the bicycle frame.

Figure 1:
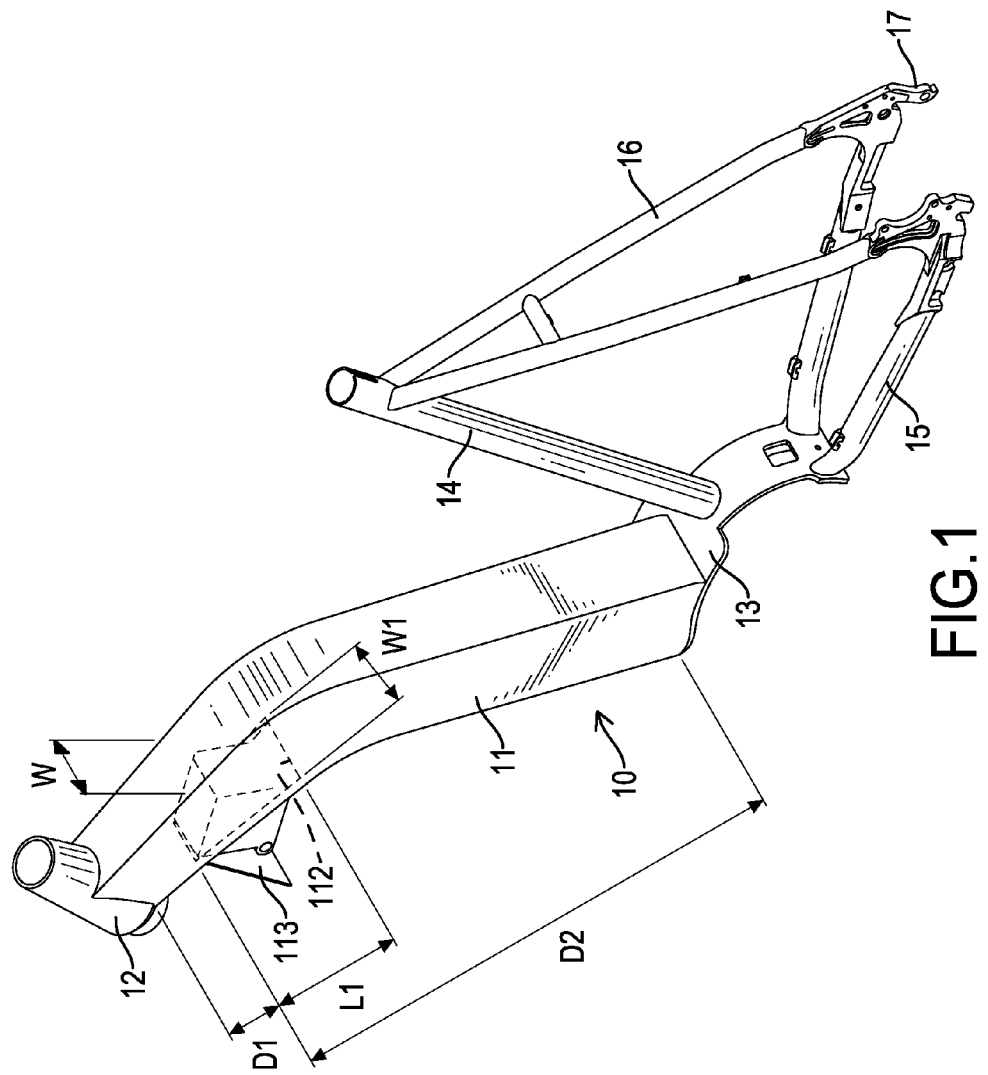
FIG. 1 is a perspective view of a first embodiment of a bicycle frame in accordance with the present invention.
Figure 2:
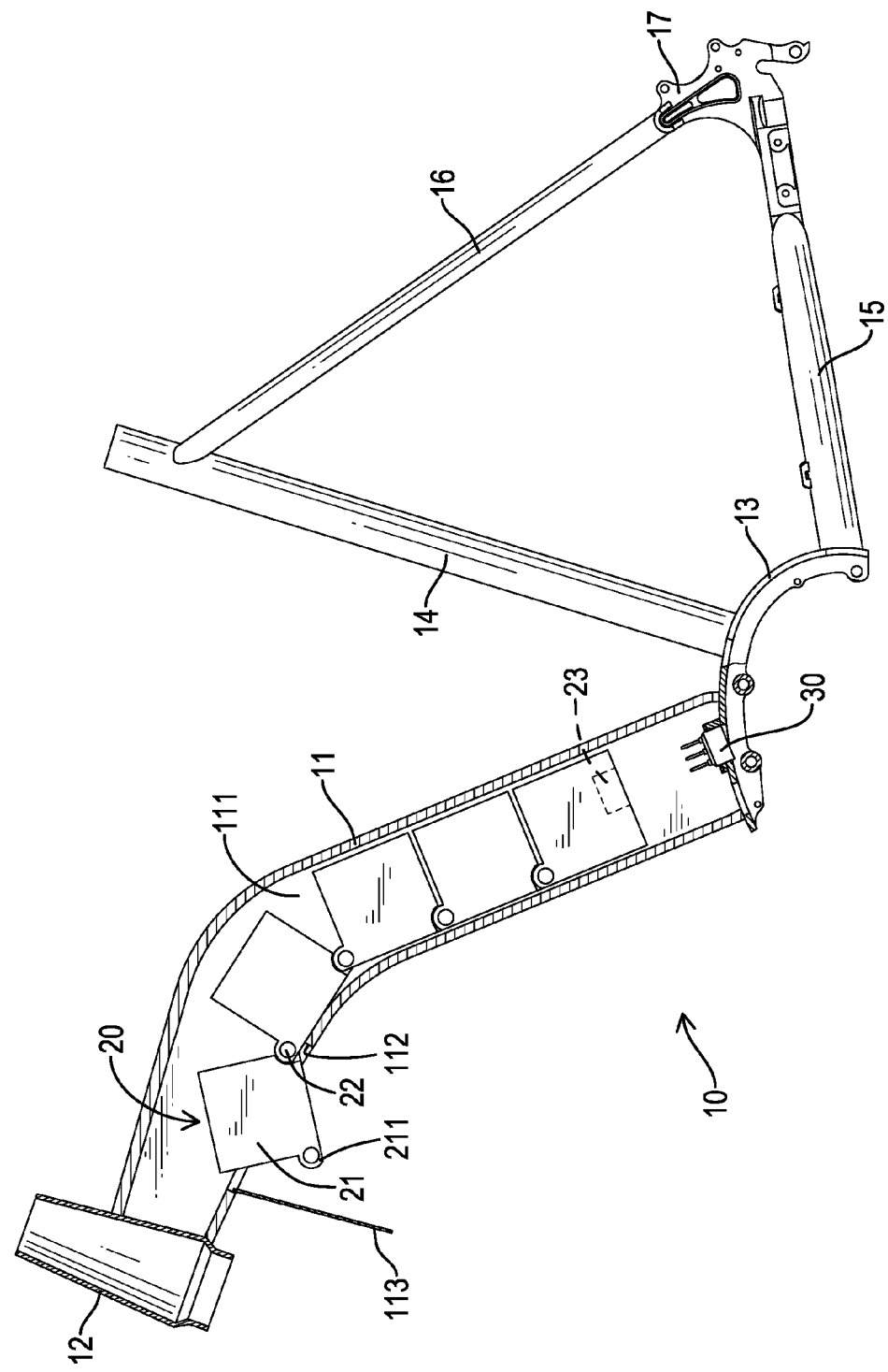
FIG. 2 is a side view in partial section of the bicycle frame in FIG. 1 showing a battery pack inserted into the bicycle frame.
Figure 3:
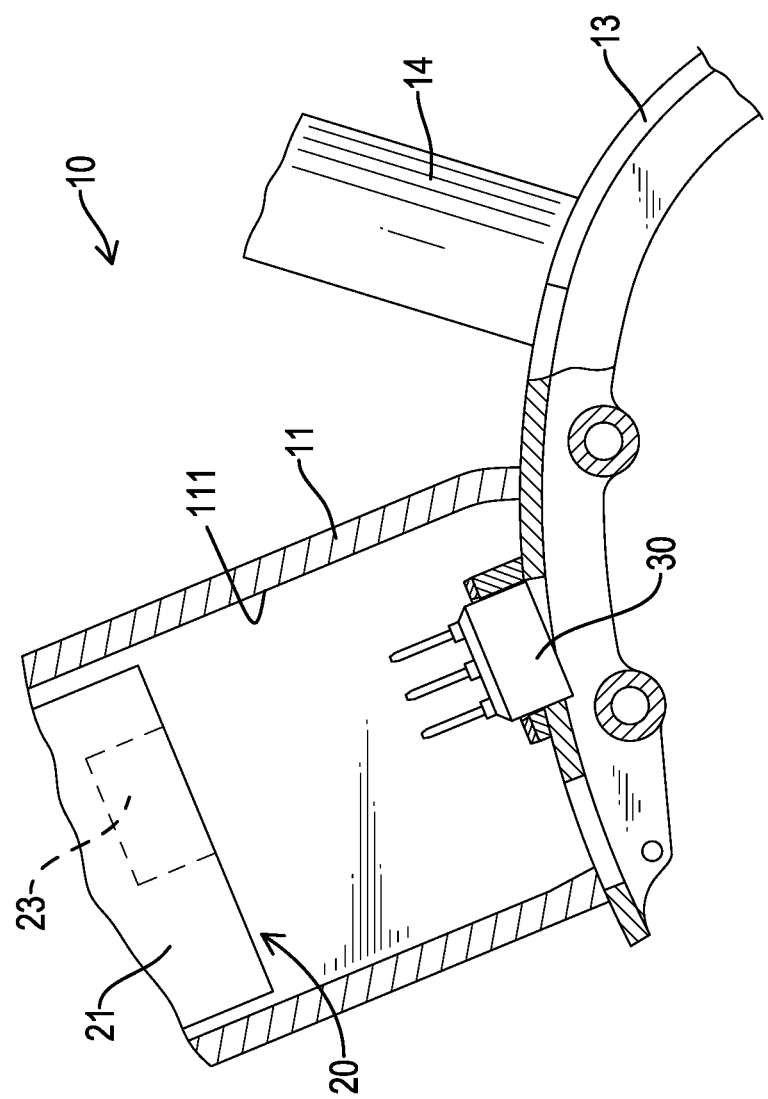
FIG. 3 is an enlarged side view in partial section of the bicycle frame in FIG. 1.

With reference to FIGS. 1, 2, and 3, a first embodiment has a bicycle frame 10, a battery pack 20 assembled to the bicycle frame 10, and an electricity conducting element 30.

With reference to FIGS. 1, 2, and 3, the bicycle frame 10 has a down tube 11, a head tube 12, a supporting seat 13, a seat tube 14, two chain stays 15, two seat stays 16, and two dropouts 17. The down tube 11 is hallow and has a width W, a front end, a rear end, an upper peripheral side surface, a lower peripheral side surface, a receiving space 111, a replacement opening 112, and a cover 113. The front end and the rear end of the down tube 11 are opposite each other. And the front end of the down tube 11 is higher than the rear end of the down tube 11. The upper peripheral side surface and the lower peripheral side surface of the down tube 11 are opposite each other. The receiving space 111 is formed inside the down tube 11. The replacement opening 112 is defined in the lower peripheral side surface of the down tube 11 and communicates with the receiving space 111. The replacement opening 112 may be a rectangular hole and has a front edge, a rear edge, a width W1, and a length L1. The front edge of the replacement opening 112 and the rear edge of the replacement opening 112 are opposite each other. The front edge of the replacement opening 112 faces to the front end of the down tube 11. The front edge of the replacement opening 112 is separated from the front end of the down tube 11 by a distance D1 and is separated from the rear end of the down tube 11 by a distance D2. The replacement opening 112 is adjacent to the front end of the down tube 11 and the distance D1 is smaller than the distance D2. The width W1 of the replacement opening 112 is substantially equal to or smaller than the width W of the down tube 11. The length L1 of the replacement opening 112 is substantially equal to or larger than the width W1 of the replacement opening 112. The length L1 of the replacement opening 112 is smaller than twice the width W1 of the replacement opening 112. The cover 113 covers the replacement opening 112. The cover 113 may be fit with, engaged with, or hinged on a tube body of the down tube 11. In the first embodiment, the cover 113 is hinged on the tube body of the down tube 11 and is engaged with the tube body of the down tube 11 to cover the replacement opening 112.

With reference to FIGS. 1, 2, and 3, the head tube 12 is connected to the front end of the down tube 11 and is substantially erected. The supporting seat 13 is connected to the rear end of the down tube 11 and has a rear end opposite the down tube 11. The supporting seat 13 is utilized for assembling an electric motor. The seat tube 14 is connected to the supporting seat 13, is located in the back of the down tube 11, and is substantially erected. The two chain stays 15 are connected to the rear end of the supporting seat 13 and two rear ends of the two chain stays 15 are opposite the supporting seat 13. The two seat stays 16 are connected to the seat tube 14 and two rear ends of the two seat stays 16 are opposite the seat tube 14. The two dropouts 17 are respectively connected to the two rear ends of the two chain stays 15 and the two rear ends of the two seat stays 16. The battery pack 20 is mounted inside the down tube 11 of the bicycle frame 10.

The battery pack 20 is mounted in the receiving space 111 of the down tube 11 and has multiple batteries 21. Each battery 21 of the multiple batteries 21 is capable of being pivotally rotated or swung to pass through the replacement opening 112. Each two of the multiple batteries 21 may be connected by a hinge, connected by pivot shafts, connected by a chain, or connected by a flexible belt-shaped unit. Each two adjacent batteries 21 of the multiple batteries 21 are able to pivotally rotate relative to each other. And the two adjacent batteries 21 of the multiple batteries 21 are capable of being pivoted or swung to pass through the replacement opening 112 of the down tube 11 for replacing the battery pack 20. The battery pack 20 may be connected to the electric motor by plugs, wires, or other conventional connecting means to supply power to the electric motor.

With reference to FIGS. 1, 2, and 3, the battery pack 20 in accordance with the first embodiment has five batteries 21. The battery pack 20 has two opposite ends. The five batteries 21 are sequentially connected one by one. Each one of the batteries 21 is cubic and has a front end, a rear end, and two connecting portions 211. The front end and the rear end of the battery 21 are opposite each other. The two connecting portions 211 are respectively formed at the front end and the rear end of the battery 21 and respectively have corresponding structures to each other to enable two adjacent batteries 21 to connect with each other. Each two adjacent batteries 21 of the five batteries 21 are connected with each other by two corresponding connecting portions 211 of the two adjacent batteries 21, and a pivot shaft 22 is mounted through the two corresponding connecting portions 211 to pivotally connect the two adjacent batteries 21. The five batteries 21 may be further distinguished into a first battery, a second battery, a third battery, a fourth battery, and a last battery. The first battery is arranged at one of the two opposite ends of the battery pack 20 and may have a handle for gripping. The last battery is arranged at the other end of the battery pack 20, is inserted in the receiving space 111 of the down tube 11, and has an electric coupling 23. In the first embodiment of the present invention, the electric coupling 23 is a socket.

With reference to FIGS. 1, 2, and 3, the electricity conducting element 30 is assembled on the supporting seat 13 of the bicycle frame 10. As the battery pack 20 is inserted into the receiving space 111 of the down tube 11, the electricity conducting element 30 is connected to the electric coupling 23 formed on the last battery of the battery pack 20.

With reference to FIGS. 1, 2, and 3, the battery pack 20 is inserted into the receiving space 111 of the down tube 11. The batteries 21 of the battery pack 20 are sequentially connected one by one and each two adjacent batteries 21 of the battery pack 20 are able to pivotally rotate relative to each other. Each battery 21 can be pivotally rotated or swung to adjust an orientation of the battery 21 for easily passing through the replacement opening 112 and sliding into the receiving space 111. The battery pack 20 is hidden in the receiving space 111, and a self-weight of the battery pack 20 ensures that the electric coupling 23 is securely connected to the electricity conducting element 30. During replacement of the battery pack 20, the handle can be held to pull the battery pack 20 out from the replacement opening 112 to achieve easy replacement of the battery pack 20.

Figure 4:
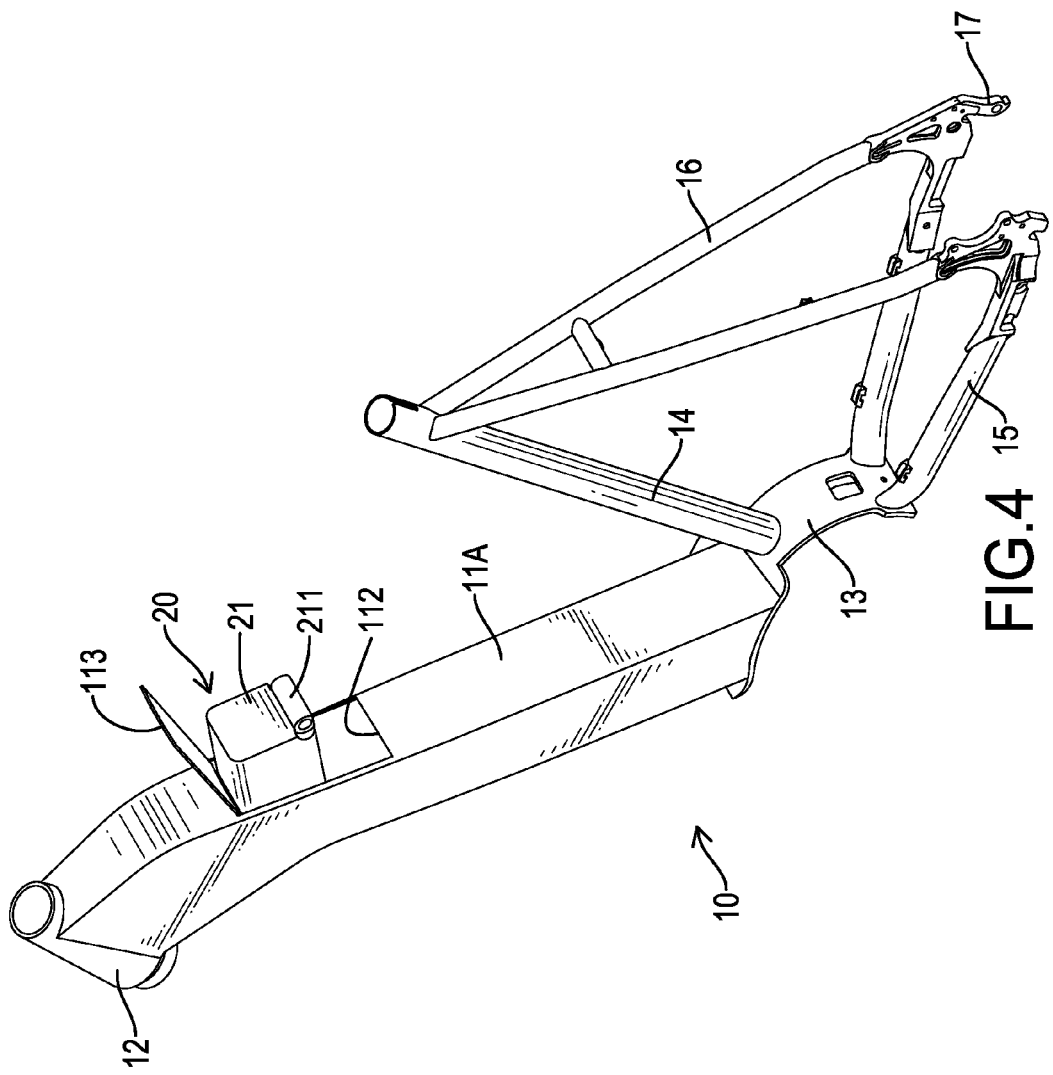
FIG. 4 is a perspective view of a second embodiment of a bicycle frame in accordance with the present invention.
Figure 5:
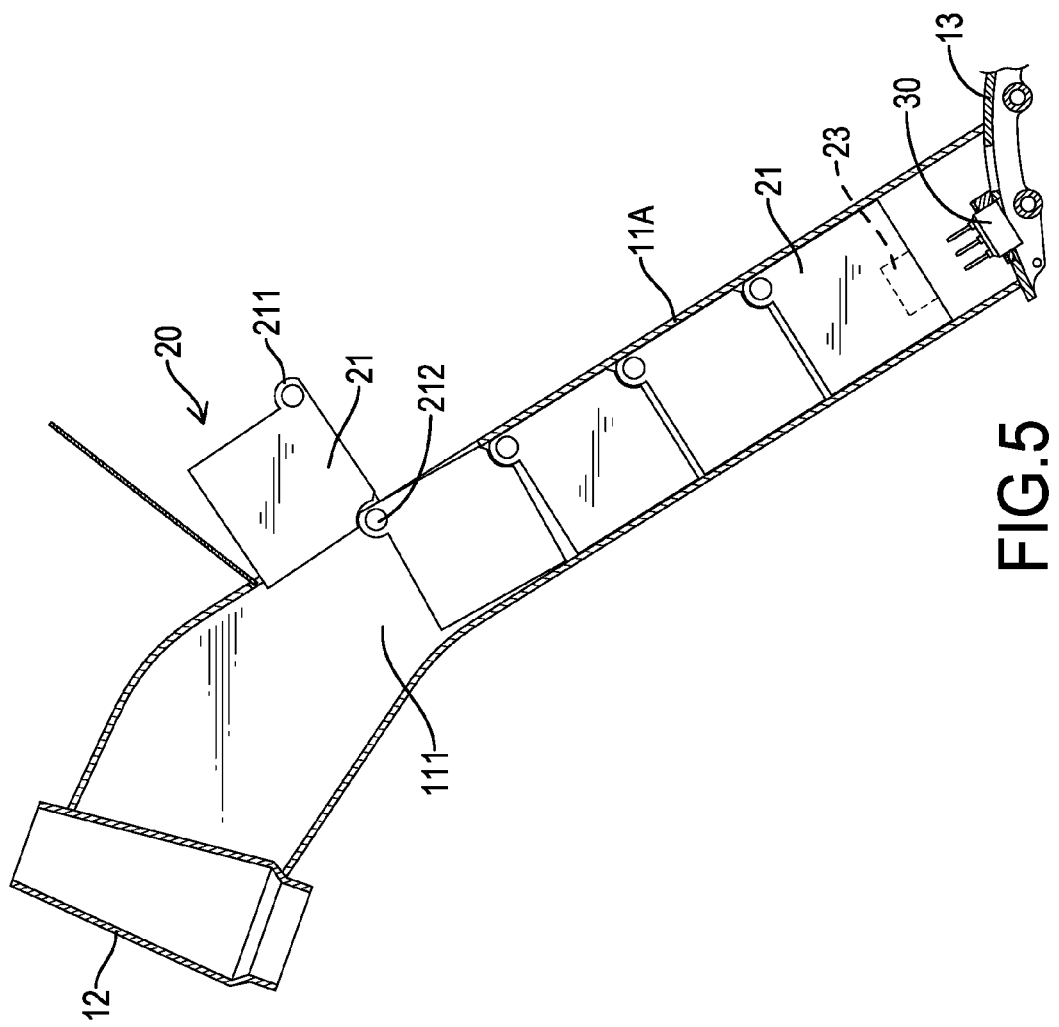
FIG. 5 is an enlarged side view in partial section of the bicycle frame in FIG. 4.

With reference to FIGS. 4 and 5, the second embodiment in accordance with the present invention has the bicycle frame 10 and the battery pack 20 mounted inside the bicycle frame 10. In the second embodiment, the replacement opening 112 is defined in the upper peripheral side surface of the down tube 11A. The replacement opening 112 is adjacent to the front end of the down tube 11A. And the distance D1 defined between the front edge of the replacement opening 112 and the front end of the down tube 11A is smaller than the distance D2 defined between the front edge of the replacement opening 112 and the rear end of the down tube 11A.

Figure 6:
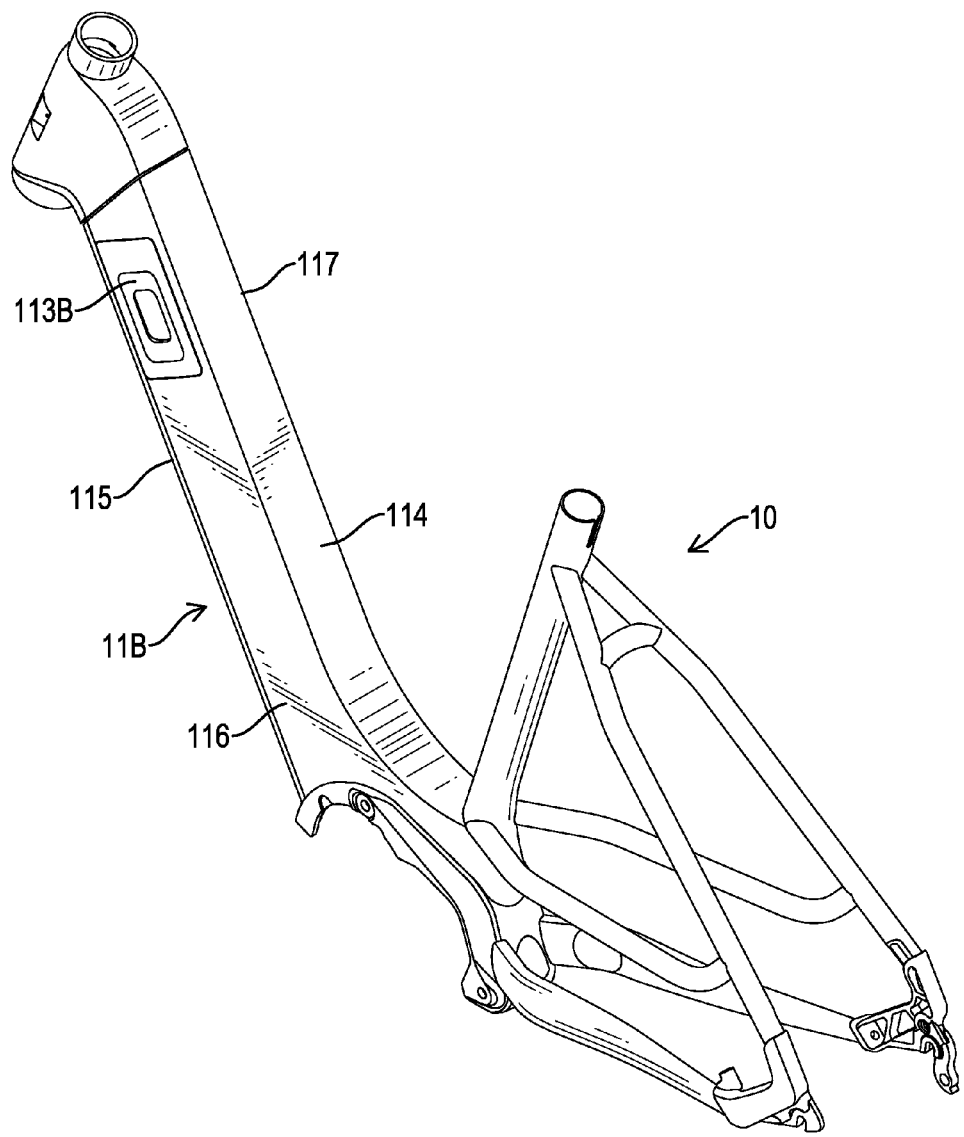
FIG. 6 is a perspective view of a third embodiment of a bicycle frame in accordance with the present invention.
Figure 7:
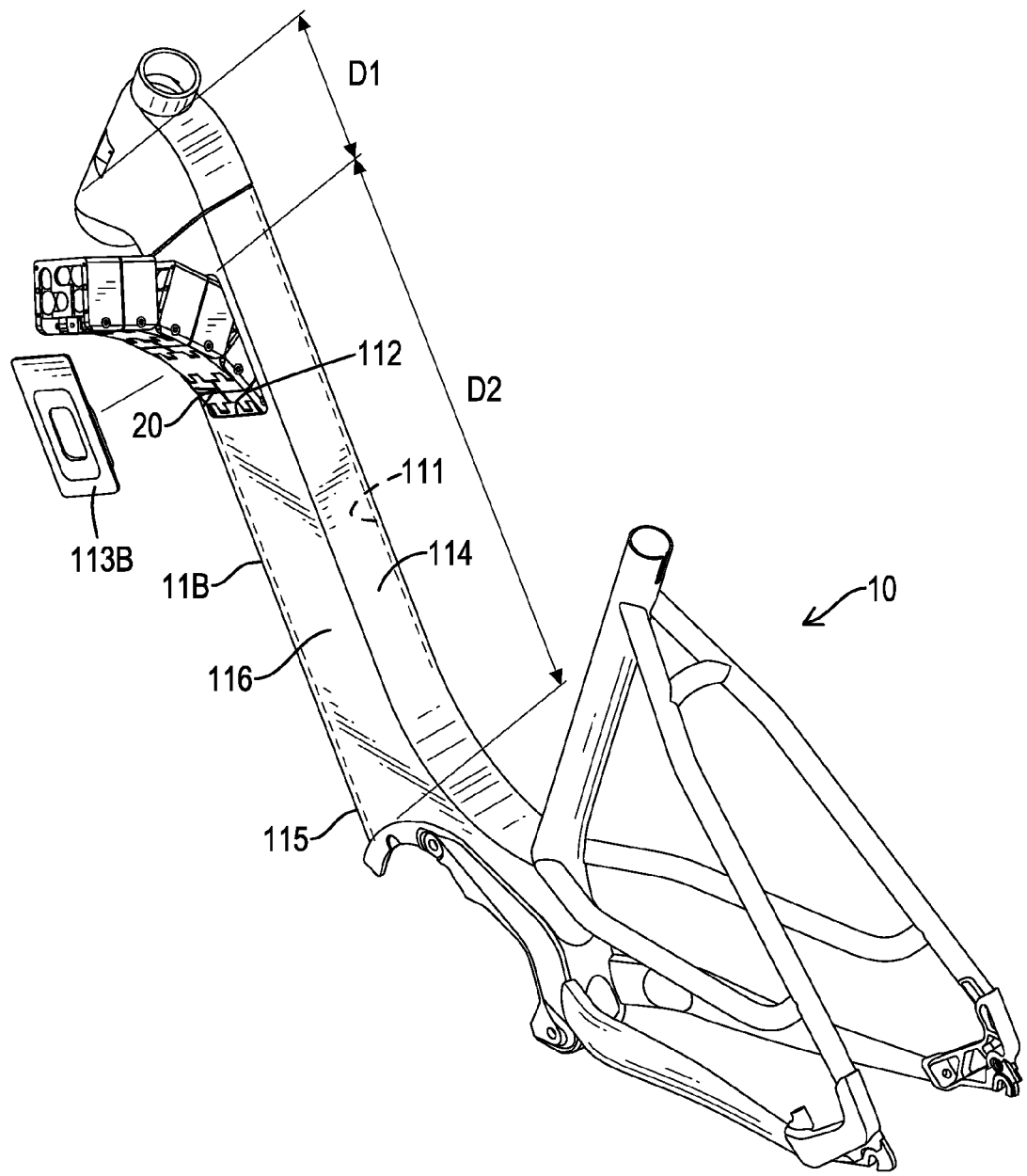
FIG. 7 is an operational perspective view of the bicycle frame in FIG. 6 showing replacement of a battery pack.

With reference to FIGS. 6 and 7, the third embodiment in accordance with the present invention has the bicycle frame 10 with multiple tube members and the battery pack 20 mounted inside one of the multiple tube members. One of the multiple tube members is hollow and has the peripheral surface, the receiving space 111 formed inside the tube member, and the replacement opening 112 defined in the peripheral surface and communicating with the receiving space 111. The down tube 11B is one of the multiple tube members and has the cover 113B. The down tube 11B has an upper peripheral side surface 114, a lower peripheral side surface 115, and two lateral peripheral side surfaces. The upper peripheral side surface 114 and the lower peripheral side surface 115 of the down tube 11B are opposite each other and respectively face to opposite directions. The two lateral peripheral side surfaces of the down tube 11B are opposite each other and respectively face to opposite directions. The two lateral peripheral side surfaces are further distinguished into a first lateral peripheral side surface 116 and a second lateral peripheral side surface 117. In the third embodiment, the replacement opening 112 is defined in the first lateral peripheral side surface 116. The replacement opening 112 is adjacent to the front end of the down tube 11B. And the distance D1 defined between the front edge of the replacement opening 112 and the front end of the down tube 11B is smaller than the distance D2 defined between the front edge of the replacement opening 112 and the rear end of the down tube 11B. The cover 113B is connected to the tube body of the down tube 11B for covering the replacement opening 112.

Figure 8:
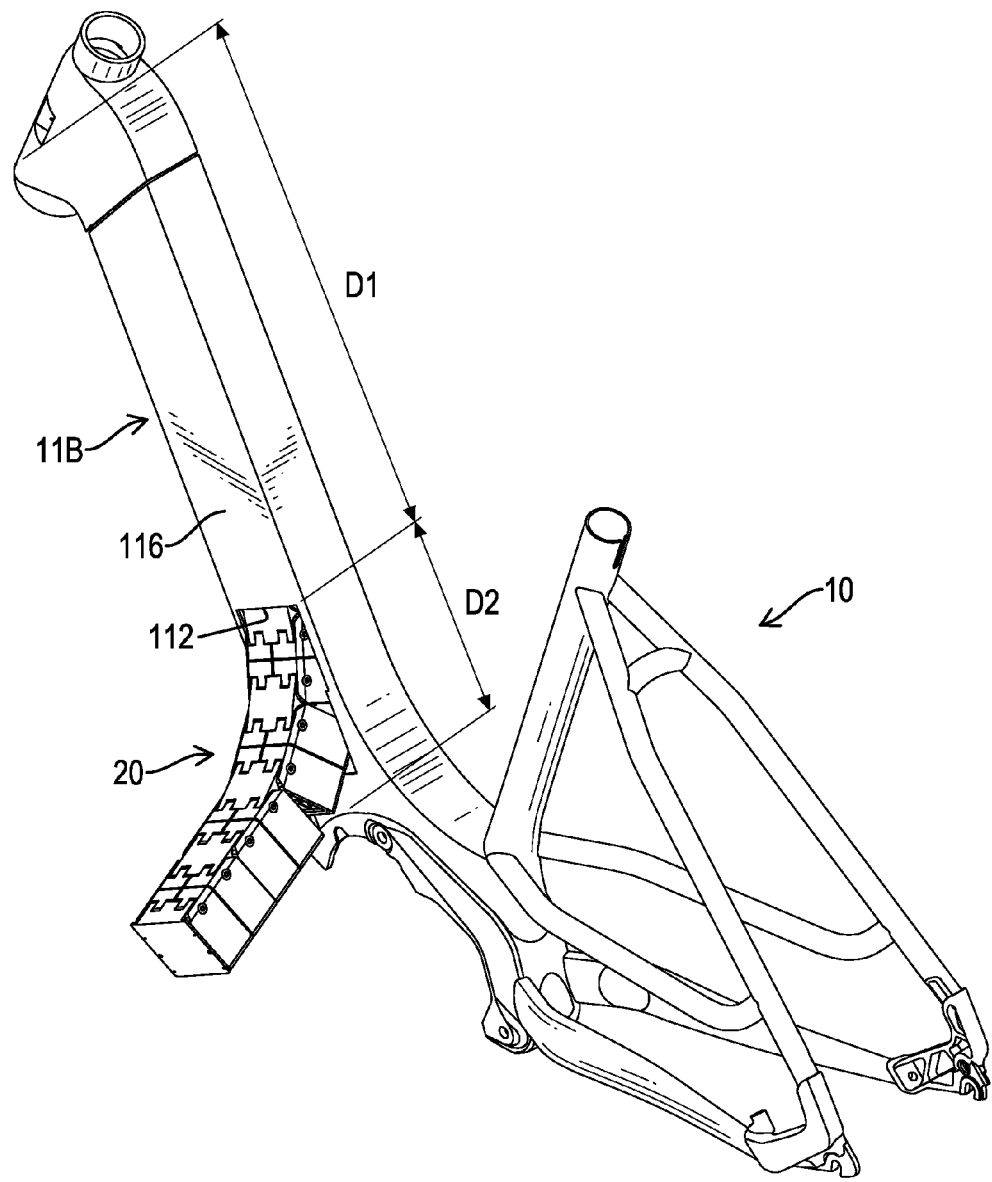
FIG. 8 is an operational perspective view of a fourth embodiment of a bicycle frame in accordance with the present invention showing replacement of a battery pack.

With reference to FIG. 8, the fourth embodiment in accordance with the present invention has the bicycle frame 10 with the multiple tube members and the battery pack 20 mounted in one of the multiple tube members. In the fourth embodiment, the replacement opening 112 is defined in the first lateral peripheral side surface 116 of the down tube 11B. The replacement opening 112 is adjacent to the rear end of the down tube 11B. And the distance D1 defined between the front edge of the replacement opening 112 and the front end of the down tube 11B is larger than the distance D2 defined between the front edge of the replacement opening 112 and the rear end of the down tube 11B.

Figure 9:
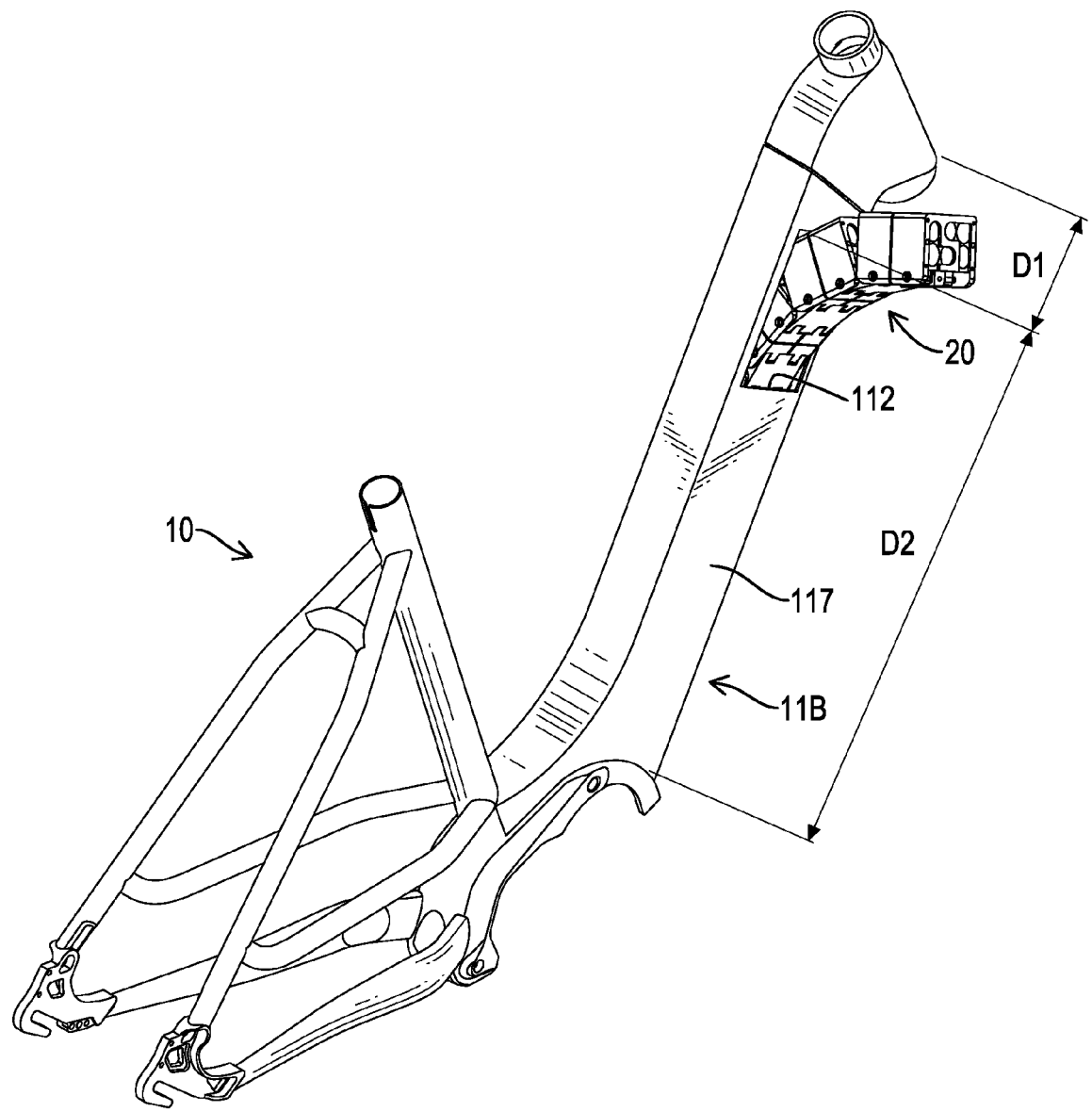
FIG. 9 is an operational perspective view of a fifth embodiment of a bicycle frame in accordance with the present invention showing replacement of a battery pack.

With reference to FIG. 9, the fifth embodiment in accordance with the present invention has the bicycle frame 10 with the multiple tube members and the battery pack 20 mounted in one of the multiple tube members. In the fifth embodiment, the replacement opening 112 is defined in the second lateral peripheral side surface 117 of the down tube 11B. The replacement opening 112 is adjacent to the front end of the down tube 11B. And the distance D1 defined between the front edge of the replacement opening 112 and the front end of the down tube 11B is smaller than the distance D2 defined between the front edge of the replacement opening 112 and the rear end of the down tube 11B.

Figure 10:
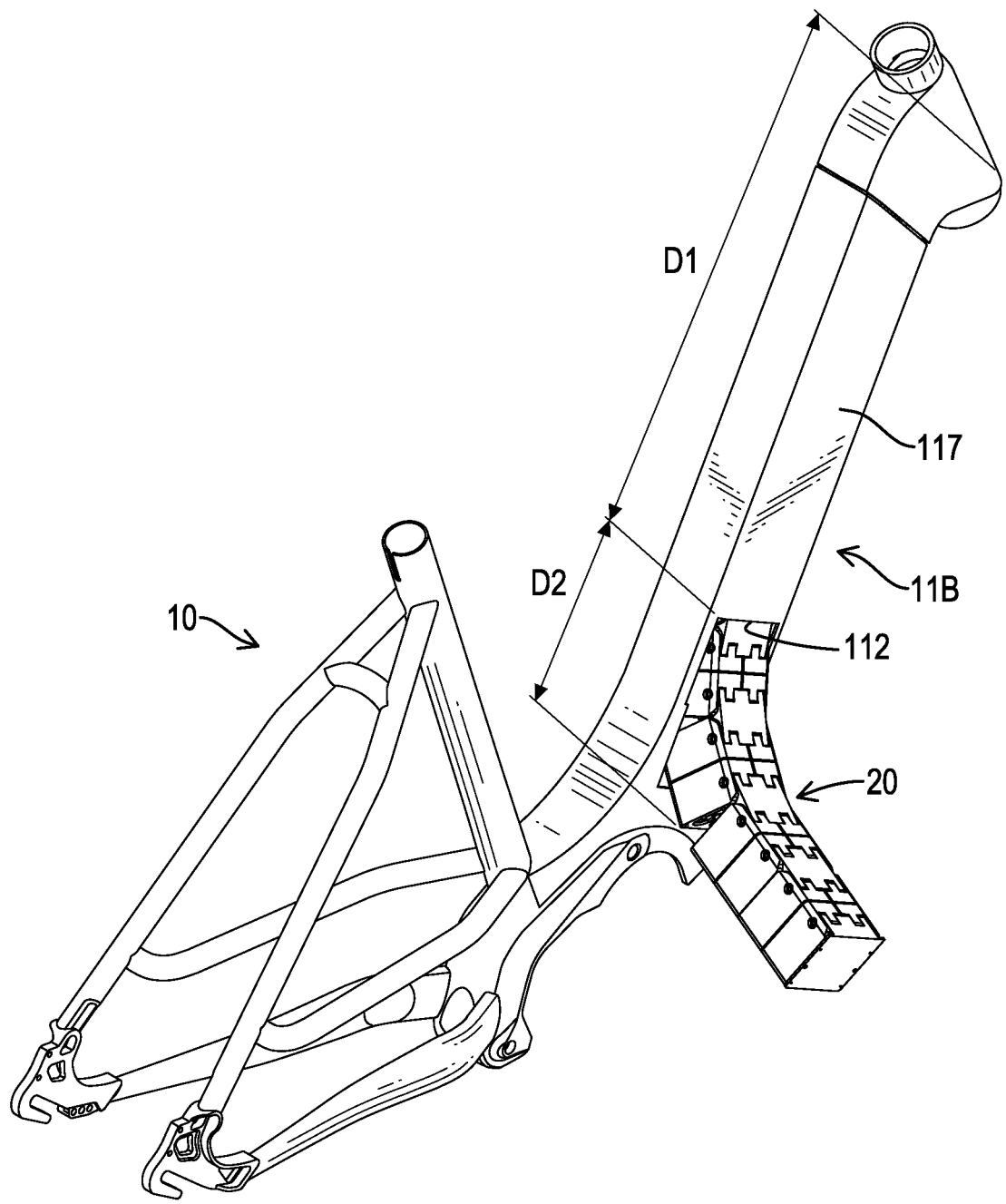
FIG. 10 is an operational perspective view of a sixth embodiment of a bicycle frame in accordance with the present invention showing replacement of a battery pack.

With reference to FIG. 10, the sixth embodiment in accordance with the present invention has the bicycle frame 10 with the multiple tube members and the battery pack 20 mounted in one of the multiple tube members. In the fifth embodiment, the replacement opening 112 is defined in the second lateral peripheral side surface 117 of the down tube 11B. The replacement opening 112 is adjacent to the rear end of the down tube 11B. And the distance D1 defined between the front edge of the replacement opening 112 and the front end of the down tube 11B is larger than the distance D2 defined between the front edge of the replacement opening 112 and the rear end of the down tube 11B.

Figure 11:
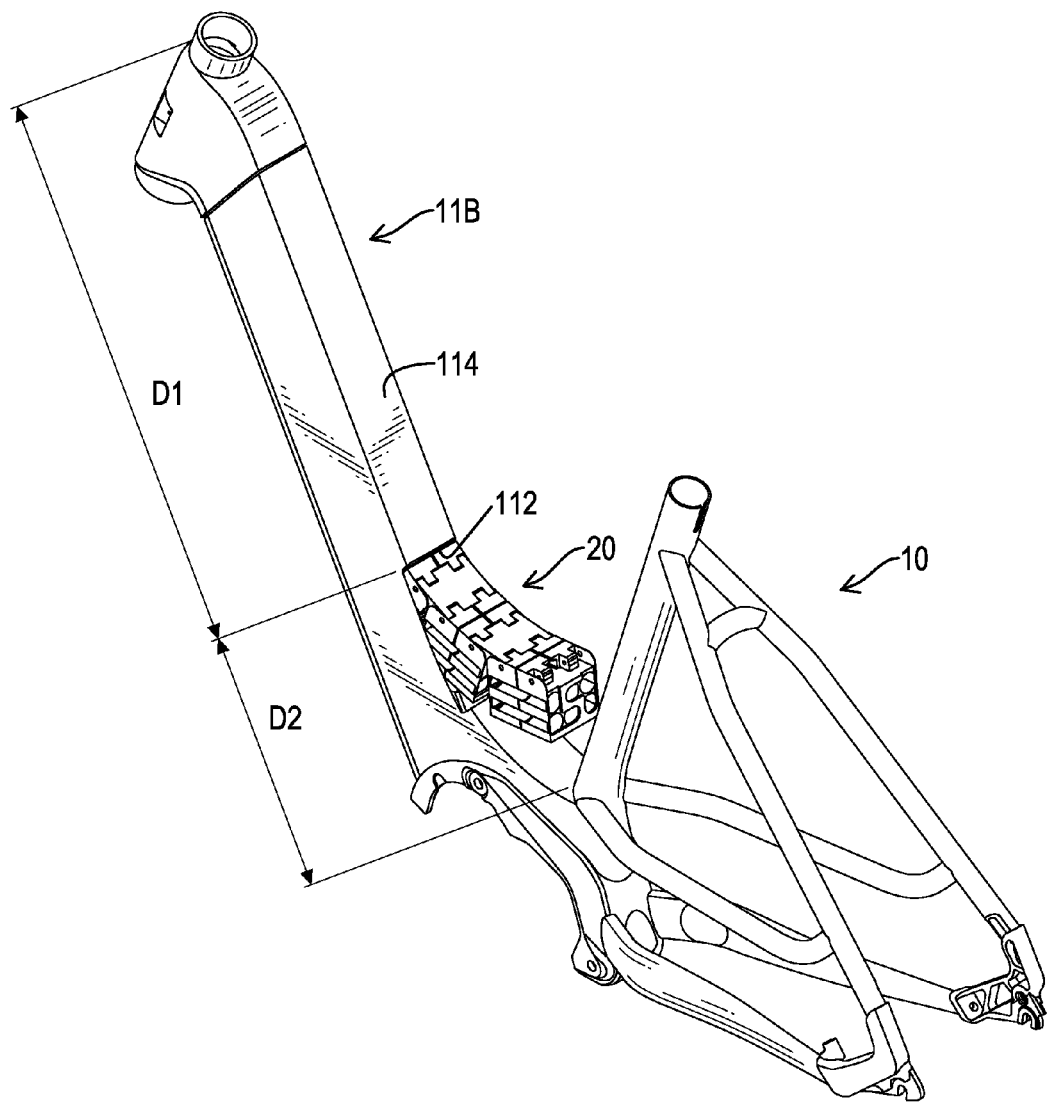
FIG. 11 is an operational perspective view of a seventh embodiment of a bicycle frame in accordance with the present invention showing replacement of a battery pack.

With reference to FIG. 11, the seventh embodiment in accordance with the present invention has the bicycle frame 10 with the multiple tube members and the battery pack 20 mounted in one of the multiple tube members. In the seventh embodiment, the replacement opening 112 is defined in the upper peripheral side surface 114 of the down tube 11B. The replacement opening 112 is adjacent to the rear end of the down tube 11B. And the distance D1 defined between the front edge of the replacement opening 112 and the front end of the down tube 11B is larger than the distance D2 defined between the front edge of the replacement opening 112 and the rear end of the down tube 11B.

Figure 12:
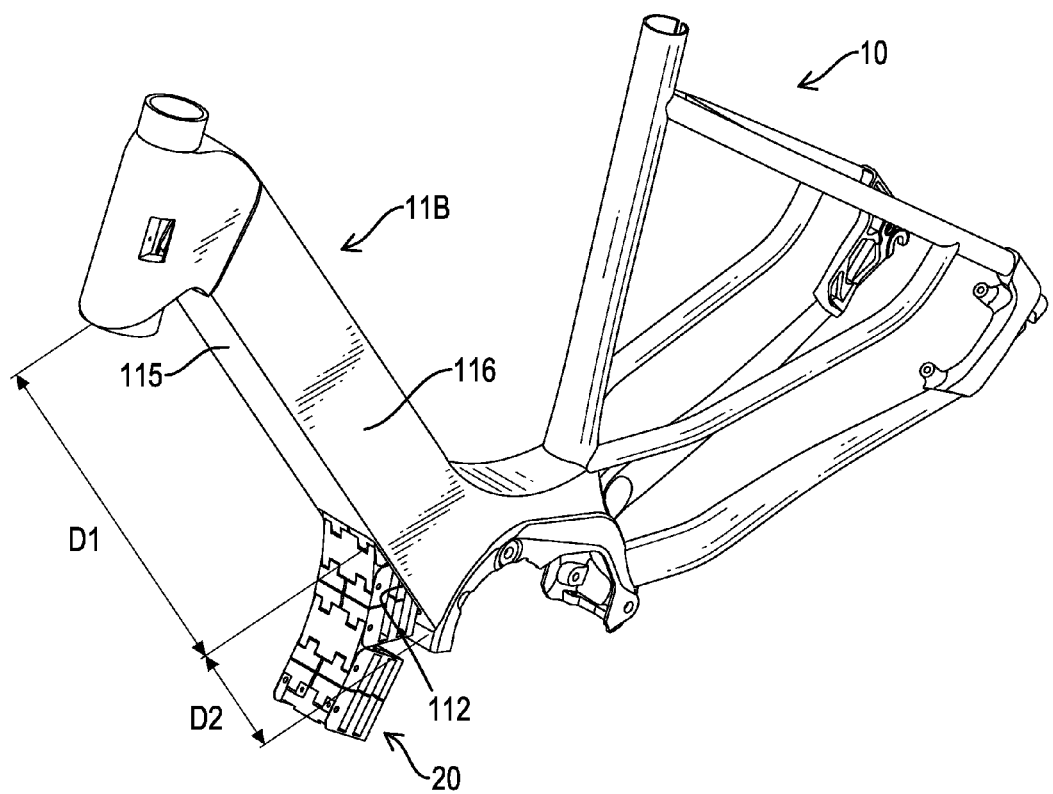
FIG. 12 is an operational perspective view of an eighth embodiment of a bicycle frame in accordance with the present invention showing replacement of a battery pack.

With reference to FIG. 12, the eighth embodiment in accordance with the present invention has the bicycle frame 10 with the multiple tube members and the battery pack 20 mounted in one of the multiple tube members. In the seventh embodiment, the replacement opening 112 is defined in the lower peripheral side surface 115 of the down tube 11B. The replacement opening 112 is adjacent to the rear end of the down tube 11B. And the distance D1 defined between the front edge of the replacement opening 112 and the front end of the down tube 11B is larger than the distance D2 defined between the front edge of the replacement opening 112 and the rear end of the down tube 11B.

Figure 13:
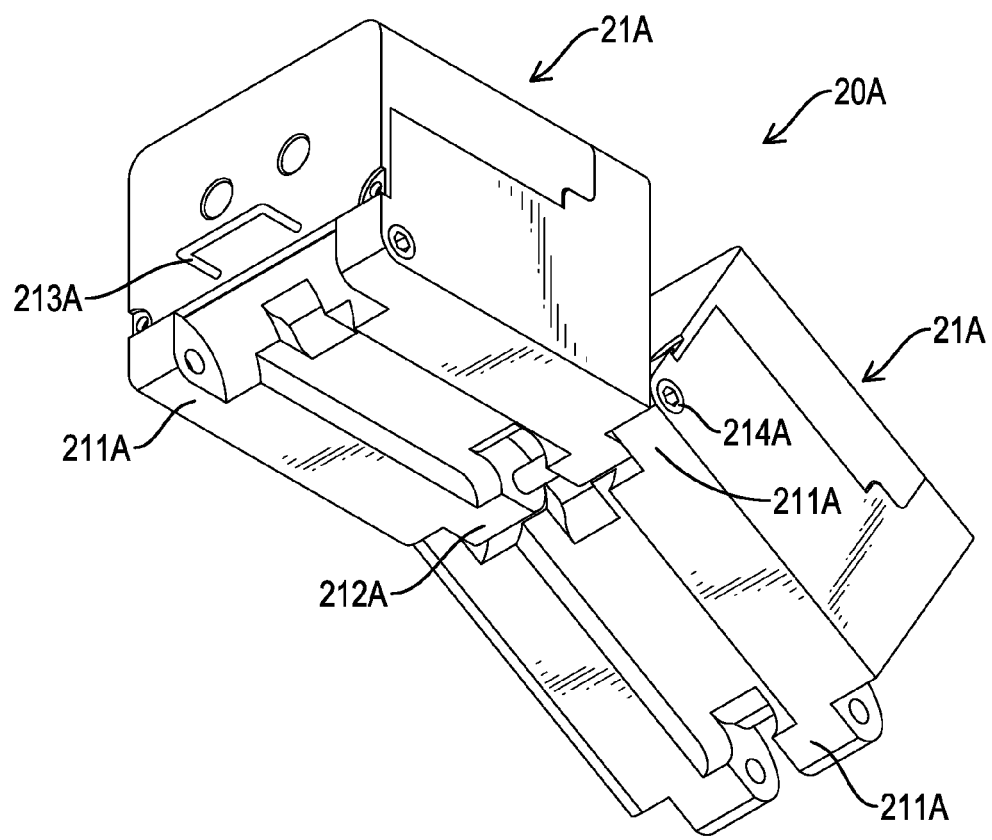
FIG. 13 is a perspective view of a battery pack in accordance with the present invention.

FIG. 13 shows a configuration of the battery pack 20A. The battery pack 20A has two batteries 21A. Each battery 21A is cubic and has a front end, a rear end, a first connecting portion 211A, and a second connecting portion 212A. The front end and the rear end of the battery 21A are opposite each other. The first connecting portion 211A and the second connecting portion 212A respectively have corresponding structures to each other to enable two adjacent batteries 21A to connect with each other. The first connecting portion 211A and the second connecting portion 212A are respectively formed at the front end and the rear end of the battery 21A. The first connecting portion 211A has a recess formed in the front end of the battery 21A. The second connecting portion 212A has two spaced protrusions formed on the rear end of the battery 21A. The two batteries 21A are further distinguished into a first battery and a second battery. A handle 213A is formed at the front end of the first battery. The two protrusions of the second connecting portion 212A of the first battery are held in the recess of the first connecting portion 211A of the second battery. A pivot shaft 214A is mounted through the first connecting portion 211A of the second battery and the second connecting portion 212A of the first battery to pivotally connect the first battery and the second battery.

Figure 14:
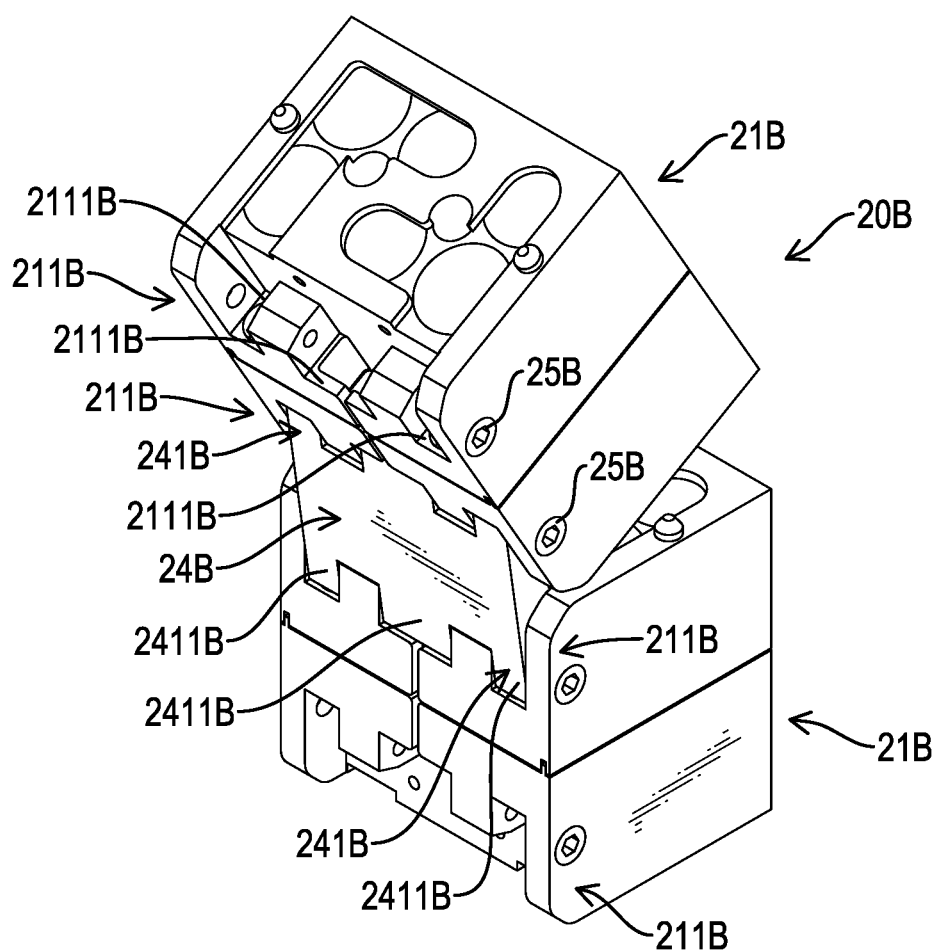
FIG. 14 is a perspective view of another battery pack in accordance with the present invention.

FIG. 14 shows another configuration of the battery pack 20B. The battery pack 20B has two batteries 21B, a connecting unit 24B, and two pivot shafts 25B. Each battery 21B is cubic and has two opposite ends and two connecting portions 211B respectively formed at the two opposite ends of the battery 21B. Each connecting portion 211B has three recesses 2111B. The connecting unit 24B is arranged between the two batteries 21B and has two opposite ends and two connecting segments 241B respectively formed at the two opposite ends of the connecting unit 24B. Each connecting segment 241B has three protrusions 2411B. The six protrusions 2411B of the two connecting segments 241B of the connecting unit 24B are respectively held in the six recesses 2111B of two of the connecting portions 211B of the two batteries 21B. The two pivot shafts 25B are respectively mounted through the two connecting portions 211B of the two batteries 21B and the two connecting segments 241B of the connecting unit 24B.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A bicycle frame comprising:
    a tube member being hollow and having
        a peripheral surface;
        a receiving space formed inside the tube member; and
        a replacement opening defined in the peripheral surface of the tube member and communicating with the receiving space;
    a battery pack mounted in the receiving space and having multiple batteries sequentially connected one by one, wherein
        each two adjacent batteries of the multiple batteries are connected to each other and able to pivotally rotate relative to each other; and
        each battery of the multiple batteries is capable of being pivotally rotated or swung to pass through the replacement opening.

2. The bicycle frame as claimed in claim 1, wherein the tube member is a down tube having
    a front end; and
    a rear end opposite the front end of the down tube and being lower than the front end of the down tube; and
    the replacement opening is adjacent to the front end of the down tube.

3. The bicycle frame as claimed in claim 2, wherein the down tube has a cover covering the replacement opening.

4. The bicycle frame as claimed in claim 3, wherein the replacement opening is a rectangular hole and has
    a width; and
    a length being smaller than twice the width of the replacement opening.

5. The bicycle frame as claimed in claim 4, wherein the down tube has
    an upper peripheral side surface; and
    a lower peripheral side surface opposite the upper peripheral side surface of the down tube; and
    the replacement opening is defined in the upper peripheral side surface.

6. The bicycle frame as claimed in claim 4, wherein the down tube has
    an upper peripheral side surface; and
    a lower peripheral side surface opposite the upper peripheral side surface of the down tube; and
    the replacement opening is defined in the lower peripheral side surface.

7. The bicycle frame as claimed in claim 6, wherein each of the multiple batteries has
    a front end;
    a rear end opposite the front end of the battery; and
    two connecting portions respectively formed at the front end and the rear end of the battery and respectively having corresponding structures to each other to enable two adjacent batteries to connect with each other;
    each two adjacent batteries of the multiple batteries are connected with each other by two corresponding connecting portions of the two adjacent batteries, and a pivot shaft is mounted through the two corresponding connecting portions.

8. The bicycle frame as claimed in claim 5, wherein each of the multiple batteries has
    a front end;
    a rear end opposite the front end of the battery; and
    two connecting portions respectively formed at the front end and the rear end of the battery and respectively having corresponding structures to each other to enable two adjacent batteries to connect with each other;
    each two adjacent batteries of the multiple batteries are connected with each other by two corresponding connecting portions of the two adjacent batteries, and a pivot shaft is mounted through the two corresponding connecting portions.

9. The bicycle frame as claimed in claim 1, wherein each of the multiple batteries has
    a front end;
    a rear end opposite the front end of the battery; and
    two connecting portions respectively formed at the front end and the rear end of the battery and respectively having corresponding structures to each other to enable two adjacent batteries to connect with each other;
    each two adjacent batteries of the multiple batteries are connected with each other by two corresponding connecting portions of the two adjacent batteries, and a pivot shaft is mounted through the two corresponding connecting portions.

10. The bicycle frame as claimed in claim 7, wherein the two connecting portions of each battery are distinguished into a first connecting portion and a second connecting portion;
    the first connecting portion has a recess formed in the front end of the battery; and
    the second connecting portion has two spaced protrusions formed on the rear end of the battery;
    each two adjacent batteries of the multiple batteries are connected with each other by the first connecting portion and the second connecting portion of the two adjacent batteries; and
    the two spaced protrusions of the second connecting portion of one of the two adjacent batteries are held in the recess of the first connecting portion of the other one of the two adjacent batteries, and the pivot shaft is mounted through the first connecting portion and the second connecting portion of the two adjacent batteries.

11. The bicycle frame as claimed in claim 7, wherein the battery pack has two opposite ends; and
    the multiple batteries include
        a first battery arranged at one of the two opposite ends of the battery pack and having a handle formed on the front end of the first battery; and a last battery arranged at the other end of the battery pack and having an electric coupling.

12. The bicycle frame as claimed in claim 10, wherein the battery pack has two opposite ends; and
the multiple batteries include
  a first battery arranged at one of the two opposite ends of the battery pack and having a handle formed on the front end of the first battery; and
a last battery arranged at the other end of the battery pack and having an electric coupling.

13. The bicycle frame as claimed in claim 1, wherein the tube member is a down tube having
  a front end; and
  a rear end opposite the front end of the down tube;
the down tube has two opposite lateral peripheral side surfaces; and
the replacement opening is defined in one of the lateral peripheral side surfaces and is adjacent to the front end of the down tube.

14. The bicycle frame as claimed in claim 1, wherein the tube member is a down tube having
  a front end; and
  a rear end opposite the front end of the down tube;
the down tube has two opposite lateral peripheral side surfaces; and
the replacement opening is defined in one of the lateral peripheral side surfaces and is adjacent to the rear end of the down tube.

15. The bicycle frame as claimed in claim 1, wherein the tube member is a down tube and has
  a front end; and
  a rear end opposite the front end of the down tube;
the tube member has
  an upper peripheral side surface; and
  a lower peripheral side surface opposite the upper peripheral side surface of the down tube; and
the replacement opening is defined in one of the upper peripheral side surface and the lower peripheral side surface and is adjacent to the rear end of the tube member.

16. The bicycle frame as claimed in claim 1, wherein each of the multiple batteries has
  two opposite ends; and
  two connecting portions respectively formed at the two opposite ends of the battery;
the two adjacent batteries of the multiple batteries are connected to a connecting unit, and the connecting unit has
  two opposite ends; and
  two connecting segments respectively formed at the two opposite ends of the connecting unit, and respectively connected to two of the connecting portions of the two adjacent batteries; and
the two connecting segments and the two connecting portions respectively connected to the two connecting segments are respectively mounted through by two pivot shafts.

17. The bicycle frame claimed in claim 16, wherein
each connecting portion of each battery has three recesses;
each connecting segment of the connecting unit arranged between each two adjacent batteries has three protrusions;
the six protrusions of the two connecting segments of the connecting unit are respectively held in the six recesses of two of the connecting portions of the two adjacent batteries.

* * * * *